(12) United States Patent
Donahue (10) Patent No.: US 6,932,420 B1
(45) Date of Patent: Aug. 23, 2005

(54) TRUCK TAILGATE AILERON

(76) Inventor: Raymond D. Donahue, Rte. 2 Box 509, Branchland, WV (US) 25506

( * ) Notice: Subject to any disclaimer, the term of this patent is extended or adjusted under 35 U.S.C. 154(b) by 25 days.

(21) Appl. No.: 10/915,656

(22) Filed: Aug. 10, 2004

(51) Int. Cl.[7] ............................. B60J 9/04; B62D 35/00
(52) U.S. Cl. ...................................... 296/180.5; 296/51
(58) Field of Search .................. 296/180.5, 180.1, 296/180.2, 180.3, 180.4, 57.1, 56, 50, 51, 296/58, 61; 180/903; 188/2 R; 298/23 R (56) References Cited

U.S. PATENT DOCUMENTS

| | | |
|---|---|---|
| 1,259,088 A | 3/1918 | Enright |
| 3,977,718 A | 8/1976 | Nordberg |
| 4,063,772 A | 12/1977 | Kincaid |
| 4,165,118 A | 8/1979 | Jensen |
| 4,200,328 A | 4/1980 | Morgan |
| 4,201,411 A | 5/1980 | Morgan |
| 4,372,601 A | 2/1983 | Smith |
| 4,475,759 A | 10/1984 | Wine |
| 4,585,265 A | 4/1986 | Mader |
| 4,611,796 A * | 9/1986 | Orr .......................... 296/180.2 |
| 4,674,788 A | 6/1987 | Ohmura et al. |
| 4,810,022 A * | 3/1989 | Takagi et al. ............ 296/180.5 |
| 4,867,499 A | 9/1989 | Stephan et al. |
| 4,884,838 A | 12/1989 | Slater |
| 5,083,829 A | 1/1992 | Fonseca |
| 5,232,260 A | 8/1993 | Lippard |
| 5,234,249 A | 8/1993 | Dorrell |
| 5,236,242 A | 8/1993 | Seeman |
| 5,324,092 A | 6/1994 | Burg |
| 5,352,008 A | 10/1994 | Denvir |
| 5,449,212 A | 9/1995 | Seifert |

(Continued)

FOREIGN PATENT DOCUMENTS

JP 401032921 A * 2/1989 ................ 296/57.1

*Primary Examiner*—H. Gutman
(74) *Attorney, Agent, or Firm*—Bowles Rice McDavid Graff & Love LLP; John J. Giblin, Jr.; Anthony P. Tokarz (57) ABSTRACT

A tailgate aileron system is disclosed, in which a tailgate of a pick-up truck, dump truck or portable roll-off contained has a rectangular opening within which is installed an aileron capable of manual or powered operation. The aileron pivots on an axle disposed horizontally through the central axis of the aileron. The aileron axle registers with bushings disposed in the sides of the rectangular opening of the tailgate. One end of the axle protrudes beyond the side of the rectangular opening and conjoins with a means for operating the aileron. A manual means for operating the aileron is comprised of a positioning handle mounted orthogonal to the axle, which is rotated by hand and is fixed in a desired attitude by an index pin which registers with one of a plurality of indices on the positioning handle. A powered means for operating the aileron is comprised of an electric motor which turns the aileron through a system of gears. A brake is provided which holds the axle stationary while the electric motor is idle. Another embodiment of the invention is comprised of an aileron mounted in a rear gate of an industrial dump truck, which is operated by a cam lever or by a pneumatic or hydraulic actuator.

13 Claims, 6 Drawing Sheets

U.S. PATENT DOCUMENTS

| | | |
|---|---|---|
| 5,468,037 A | 11/1995 | Peterson et al. |
| 5,486,032 A | 1/1996 | Reed et al. |
| 5,516,178 A * | 5/1996 | Grant ..................... 296/57.1 |
| 5,518,287 A | 5/1996 | Totani |
| 5,645,310 A | 7/1997 | McLaughlin |
| 5,688,020 A | 11/1997 | Burg |
| 5,722,714 A | 3/1998 | Vallerand |
| 5,735,567 A | 4/1998 | Mora, Sr. |
| 5,743,589 A | 4/1998 | Felker |
| 6,206,444 B1 | 3/2001 | Casey |
| 6,742,826 B2 * | 6/2004 | Humphrey et al. ........... 296/51 |
| 2002/0053813 A1 | 5/2002 | Wilde |
| 2003/0015885 A1 * | 1/2003 | Landwehr .................... 296/61 |
| 2004/0189047 A1 * | 9/2004 | Barry ..................... 296/180.1 |

* cited by examiner

TRUCK TAILGATE AILERON

BACKGROUND OF THE INVENTION

1. Field of the Invention

The invention disclosed herein relates to an aileron accessory in the tailgate of light trucks.

2. Description of the Related Art

Pick-up trucks are a popular form of vehicle used by both individuals and small businesses alike. They provide a means for hauling light cargo and bulky articles that could not otherwise be carried in a typical sedan, coupe or other personal vehicle, as well as for other personal transportation needs, such as for commuting to work or for running errands. When the pick-up truck is not used for hauling light cargo, the open truck bed usually remains empty and open.

The open truck bed in a pick-up truck causes aerodynamic drag on the vehicle, reducing its efficiency and gas mileage. The principle source of aerodynamic drag in the bed of a pick-up truck is the tailgate. This abrupt vertical end of the vehicle prevents a smooth, gradual convergence of the aerodynamic streamlines from around the sides and bottom of the vehicle, causing separation of the streamlines from the vehicle and a zone of low pressure eddies directly behind the tailgate. This zone of low pressure acting on the exterior of the tailgate holds back the vehicle, causing increased aerodynamic drag on the vehicle.

Various techniques have been used to reduce the drag caused by the tailgate. One has been to simply place the tailgate in the lowered position. However, this is unlawful in many jurisdictions, as well as causing a potential hazard of releasing any cargo in the bed.

Another common solution has been to remove the tailgate and replace it with an open mesh, flexible net-like apparatus. This allows a significant amount of air flow and a consequent reduction in drag, as well as retaining any cargo in the bed. However, this tailgate net is unsuitable for carrying friable or granular materials, such as sand or gravel, which may flow through the mesh openings.

U.S. Pat. No. 1,259,088, issued to Enright on Mar. 12, 1918, discloses an end gate for a mobile cargo container, such as a wagon bed, which is operable with a handle connected to an eccentric crankshaft. This general concept may be applicable to the solution for relieving aerodynamic drag on a tailgate. However, the operating mechanism is bulky and cumbersome, and could not, as described, maintain the attitude or position of the end gate at highway speeds common today.

U.S. Pat. No. 3,977,718, issued to Nordberg on Aug. 31, 1976, discloses a turnable truck gate. It is comprised of a tailgate divided horizontally into two sections, wherein each section pivots to an open position. This design relieves the aerodynamic drag, but defeats its utility as a tailgate because the upper section is permanently engaged to the sides of the truck bed, and cannot be disengaged and lowered as with a conventional tailgate. Any heavy item of cargo must be lifted above the top section of the tailgate.

U.S. Pat. No. 4,200,328, issued to Morgan on Apr. 29, 1980, discloses a tailgate construction. One embodiment of that invention included a tailgate comprised of a frame with several horizontal louver panels. Each panel is pivotally hinged at its upper edge, allowing the body of each panel to swing outward. Each panel is held in the open position by a hook latch. While this design relieves the aerodynamic drag on a truck tailgate, it is difficult and cumbersome to operate, and each panel can be opened only to one position, as determined by the size and placement of the hook latch.

U.S. Pat. No. 4,475,759, issued to Wine on Oct. 9, 1984, discloses a pick-up truck having a streamlining tailgate. The streamlining tailgate is comprised of a section which pivots about a horizontal transverse axis within the side frame of the tailgate at either a midpoint or at the top edge of the section. The section is held in various attitudes by engagement with indices in an external arcuate bracket. Since the brackets are external to the tailgate, they pose a possible obstruction to cargo and undesirable visual element within the truck bed.

U.S. Pat. No. 5,468,037, issued to Peterson et al. on Nov. 21, 1995, discloses a dual pivot pick-up tailgate. The tailgate is comprised of a panel disposed within a frame around the sides and bottom of the panel. The panel engages the frame at its upper corners and pivots about a horizontal transverse axis through these points of engagement. The pivotal engagement points are capable of longitudinal translation along the respective top edges of the truck bed sides. This allows the tailgate section to pivot horizontally and slide forward, thereby providing an opening in the tailgate for relieving aerodynamic drag. The disadvantage of this design is that the sliding panel section, when in the opened position, substantially reduces the volumetric cargo capacity of the truck bed.

SUMMARY OF THE INVENTION

To relieve aerodynamic drag created by tailgates in pick-up trucks, as well as other trucks and portable cargo containers, and to solve the inherent disadvantages of the prior art, disclosed herein is a tailgate with a pivotal aileron section integral within an opening in the tailgate. The aileron pivots about a longitudinal horizontal axis by means of an axle which extends into the side of the surrounding tailgate frame. The upper and lower edges of the aileron, as well as the corresponding edges of the tailgate frame into which the aileron is disposed, are associatively beveled or contoured so that the interior surface of the aileron, when in the upright closed position, forms a continuous planar surface with the interior surface of the tailgate frame while precluding further rotation past the closed position. This important feature permits standard, typical uses of the tailgate, such as for sliding heavy cargo across the interior surface of the tailgate (in the lowered, open attitude) in and out of the bed, without causing the aileron to open or to snag or catch on an edge of the aileron.

A means is provided for operating and positioning the aileron panel. Several embodiments of the means for operating and positioning the aileron are provided. In most embodiments, the positioning means is within the tailgate frame laterally from the aileron. This avoids both an undesirable visual appearance and interference with the cargo volumetric capacity of the truck bed.

In one embodiment of the positioning means, an axle on the pivot axis of the aileron extends through the side of the tailgate frame into a pocket or alcove in the interior surface of the tailgate frame, and on the end of which is disposed a positioning lever. The positioning lever includes a handle which may be grasped and used to pivot the aileron into one of a plurality of predetermined attitudes. At each attitude, an index pin, disposed on the tailgate frame, engages one of a plurality of pre-aligned indices in the positioning lever, thereby locking the aileron in a desired attitude. In the closed position, positioning lever is unobtrusively enclosed within the pocket and the aileron is contained within the tailgate frame, permitting its use as a typical tailgate.

In another embodiment, the means for operating and positioning the aileron is by an electric motor. This electric motor is contained within the tailgate frame. Its output shaft is engaged with the axle of the aileron through a series of gears. The electric motor is powered by direct current, typically 12 volts, the same type of power supply typically used and available in personal vehicles and light trucks. The electric current is provided to the electric motor through a double-pole, double-throw switch, which can reverse the polarity of the electric current, and thereby reverse the direction of the electric motor for either opening or closing the aileron.

A third embodiment of the positioning means is provides for industrial or commercial trucks or portable containers, commonly called "roll-off containers." In this embodiment, the positioning means is disposed external of the tailgate, on its exterior side. This is more visually obtrusive, but which is not as high a concern in industrial vehicles. It still avoids obstructing the interior cargo capacity of the truck or containers.

A fourth embodiment of the positioning means provide for pressurized fluid activators, such as a pneumatic cylinder, for operating the aileron.

These and other objectives and advantages of the invention will become apparent from the description which follows. In the description, reference is made to the accompanying drawings, which from a part hereof, and in which is shown by way of illustration specific embodiments in which the invention may be protected. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DETAILED DESCRIPTION OF THE INVENTION

The following discussion describes in detail one or more embodiments of the invention. The discussion should not be construed, however, as limiting the invention to those particular embodiments, and practitioners skilled in the art will recognize numerous other embodiments as well. The complete scope of the invention is defined in the claims appended hereto.

Figure 1:
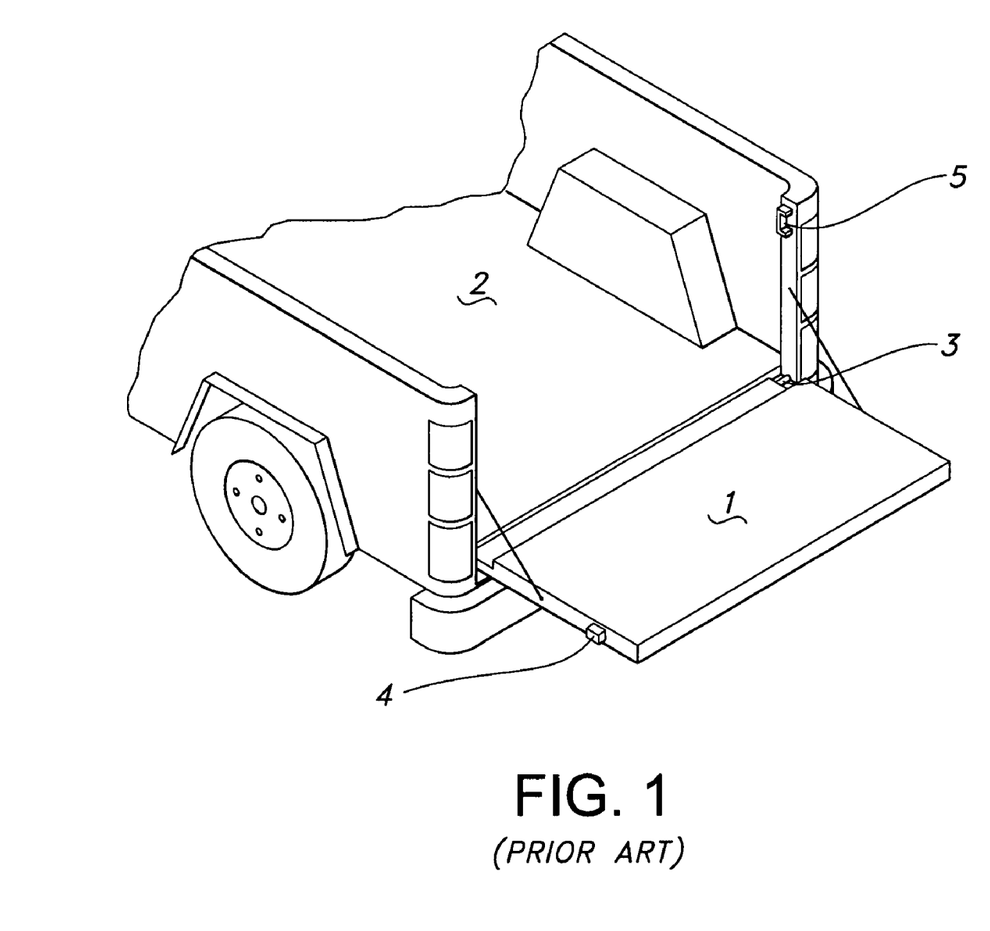
FIG. 1 is an isometric view of a tailgate of a typical pick-up truck common in the prior art.

FIG. 1 illustrates a tailgate typical in the prior art. Typically, a tailgate on a pick-up truck has a pivot hinge 3 at either lower corner. This arrangement allows the tailgate to open by pivoting rearward and downward around an axis located substantially along the lower edge of the tailgate. The tailgate 1 typically pivots ninety degrees, to an open position which is coplanar with the surface of the pick-up bed 2. In this open position, the inner surface of the tailgate 1 provides an extension of the plane of the bed surface 2. This is advantageous when inserting or removing heavy or bulky cargo into the bed 2 of the pick-up truck without the load becoming arrested on the edge of the tailgate 1 or bed 2.

In the closed position, the tailgate 1 is held in a vertical attitude by a latch mechanism. A latch bracket 5 with a catch is provided on the upper end of the sides of the tailgate opening, while a latch 4 is provided at the upper part of either side edge of the tailgate 1. When the tailgate 1 is raised to the upright, closed position, the latch 4 registers with the latch bracket 5, holding the tailgate 1 securely in position. The latch 4 is typically operated by a handle located approximately at the top center of the outside surface of the tailgate 1. The handle operates the latch 4 by a variety of mechanisms known in the art and used by the various manufacturers of pick-up trucks, but all of which function to withdraw the latch 4 from the catch into the interior of the tailgate. Once the latches 4 are withdrawn, the tailgate 1 is free to pivot to the open position.

Figure 2:
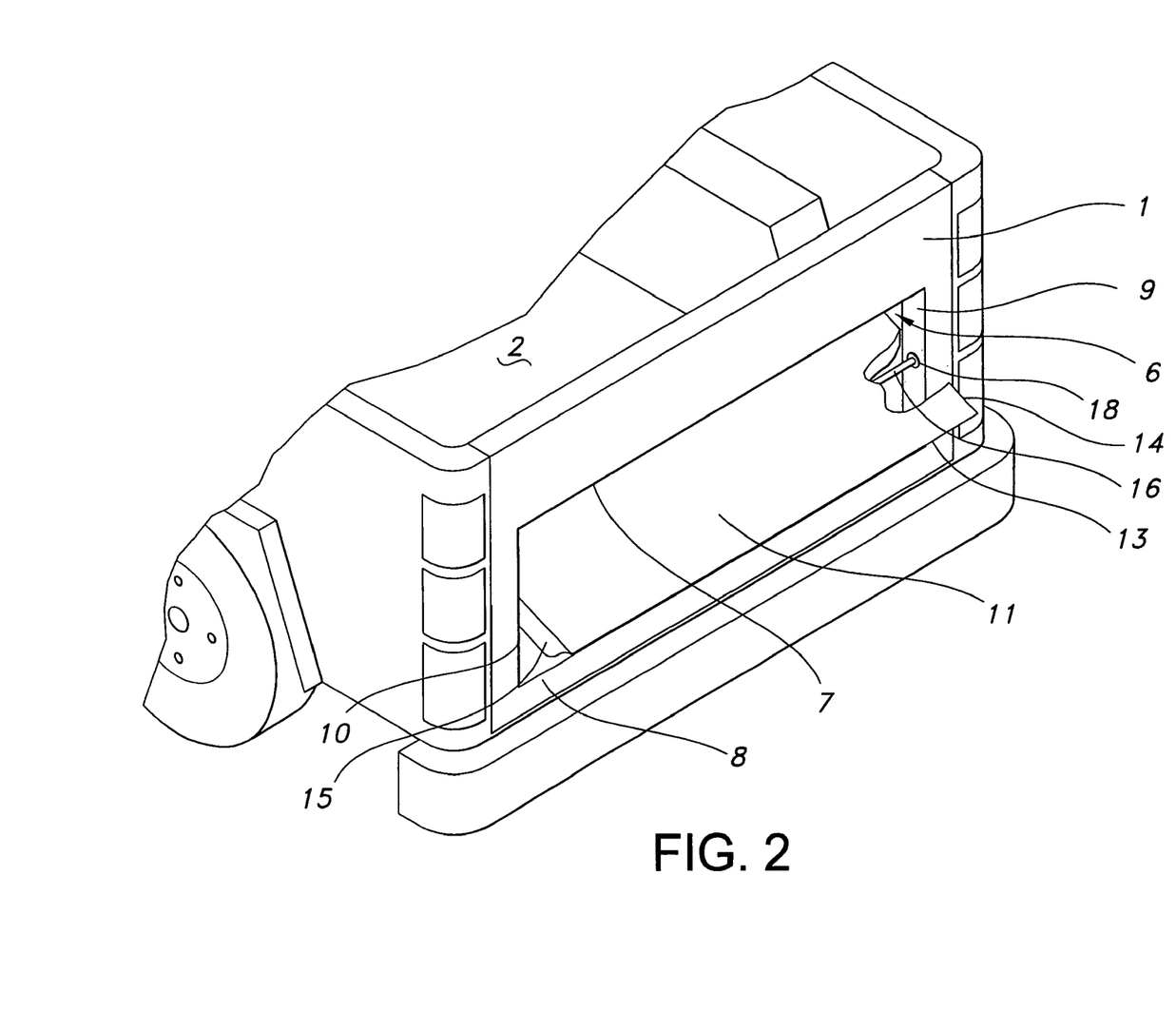
FIG. 2 is an isometric view of a tailgate with the invention of an aileron installed therein.

In the preferred embodiments of the invention as shown in FIG. 2, the typical tailgate 1 is modified to provide a rectilinear tailgate opening 6 within the interior of the tailgate 1. An aileron 11 is disposed within the tailgate opening 6. The aileron 11 is capable of pivoting about a central horizontal axle that traverses through the interior of the aileron 11 and extends into the sides 9, 10 of the tailgate opening 6.

In its closed position, the aileron's 11 interior surface is flat and coplanar with the respective surface of the tailgate 1. The exterior surface of the aileron 11 may be flat and coplanar with the respective surface of the tailgate 1, or it may be cylindrically convex about the axis of the pivotal axle. The convexity of the exterior surface provides additional aerodynamic lift than a flat aileron 11 when in the open position.

An axle 16 traverses through the horizontal midline of the aileron 11. The axle 16 is rigidly secured to the interior framework of the aileron 11 to prevent undesired rotation of the aileron 11 about the axle 16. The ends of the horizontal axle 16 extend beyond the sides 14, 15 of the aileron 11, and engage with a means of pivoting mounted on the sides 9, 10 of the tailgate opening 11, such as a bushing 18, preferably, or a bearing, which would facilitate rotation of the axle 16. The bushings 18 are mounted in holes of the tailgate opening sides 9, 10.

Figure 5:
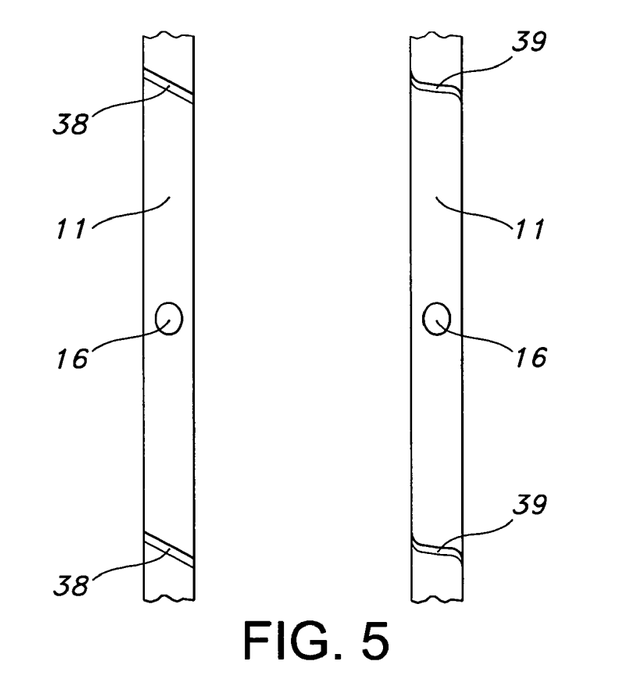
FIG. 5 is a cross-sectional view of the aileron, illustrating the association of the top and bottom edges with the opening in the tailgate.

As shown in FIG. 5, the aileron top edge 12 and bottom edge 13 and the corresponding and opposite mating tailgate opening top edge 7 and bottom edge 8 are beveled or contoured. The adjacent edges are associative, i.e., they are of the same shape so the entire width of the beveled or contoured edge 39 of the aileron 11 is substantially flush against the entire width of the tailgate opening 6. This permits the aileron to fully recess within the tailgate opening when in the closed position, thus providing a continuous flush surface across the overall tailgate 1, while precluding further rotation of the aileron 11 beyond the closed position. The contour of the mating surfaces of the aileron and the tailgate opening may be of a variety of patterns, including a simple angular bevel 38. In the preferred embodiment the contour is an inverted arc 39, similar to an "S" curve, which provides both a strong and tight joint between the aileron and the tailgate edges.

The axle first end 17 extends from the aileron first side 14 beyond the first side 9 of the tailgate opening, into the interior of the tailgate frame. This first axle end 17 engages a means for operating the aileron. The operating means for the axle may be manual or assisted by a powered motor. The operating means is capable of securely holding the aileron 11 in the closed position, whether the tailgate is in the upright, closed position or the lowered, open position. It is also capable of rotating the aileron 11, by rotating the axle, to one or more desired attitudes, up to 90 degrees from the closed position, and of securing the aileron at each desired attitude against aerodynamic torques on the aileron 11 while the pick-up truck is in motion.

Figure 3:
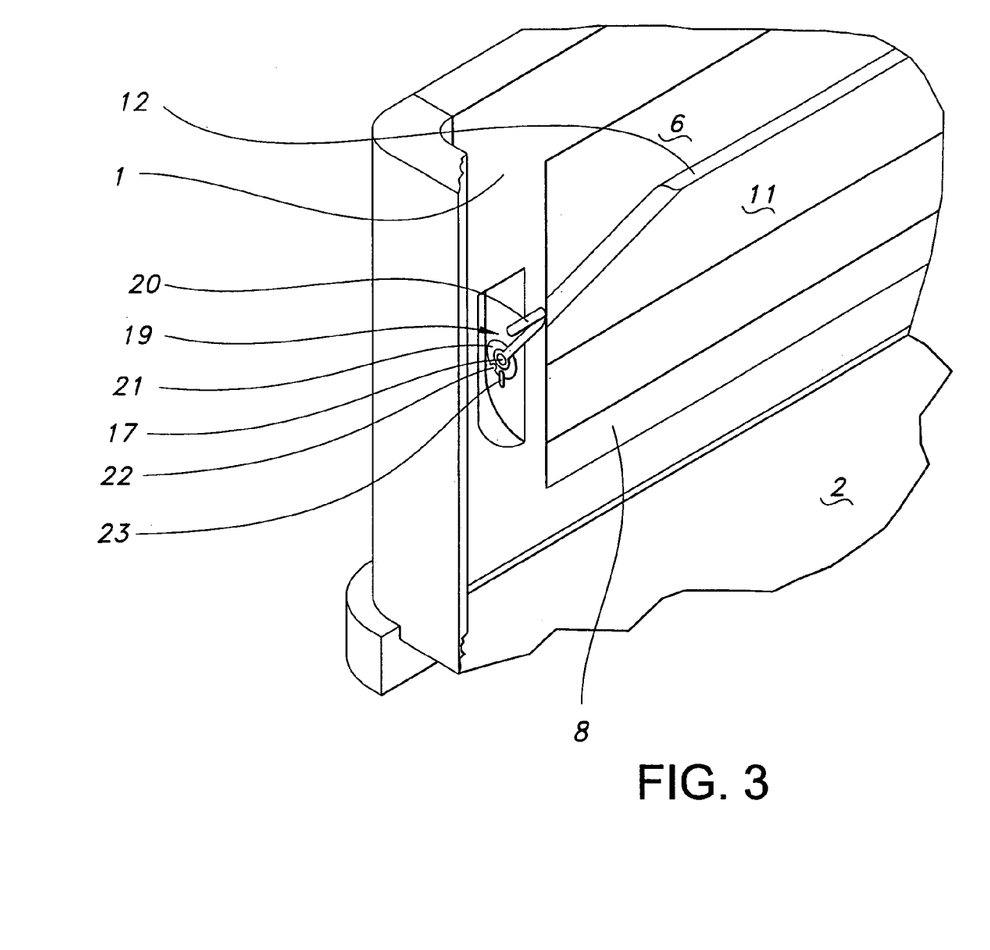
FIG. 3 is an isometric view of a tailgate with the invention, viewed from the interior of the truck bed, illustrating the manual means for operating the aileron.

As shown in FIG. 3, the manual means for operating the aileron 11 is comprised of a positioning lever 19 rigidly attached to the axle first end 17. The positing lever 19 has a handle section 20 and a body section 21. A plurality of indices 22 are spaced equidistant from the point of attachment of the positioning lever 19 to the axle first end 7, and arranged in a circular arc around the body section 21. A first index 22 is located across the point of attachment of the positioning lever 19 on the axle first end 17, directly opposite the handle section 20. One or more additional indices 22 are located at angular displacements from the first index 22, which are equal to the desired attitude(s) for opening the aileron 11. An index pin 23 is provided, which is mounted normal to the axle 16 and aligned with the arc of the indices 22 on the body section 21 of the positioning lever 19. A spring 30 is mounted around or behind the index pin 23, forcing translation of the index pin 23 towards the body section 21, thereby registering the index pin 23 with an index 22 when the two are in alignment.

Preferably, the positioning lever 19 and index pin 23 are located in a concave inset or alcove in the interior side of the tailgate 1. This permits ready access to the positioning lever 19 without diminishing the aesthetic appearance of the exterior vehicle body.

When the aileron 11 is in the upright, closed position, the index pin 23 engages with the first index 22 on the body section 21 of the positioning lever 19 directly across the axle first end 17 from the handle section 20. To open the aileron 11, the handle section 20 is grasped and pulled, thereby forcing the index pin 23 to disengage from the first index 22. The aileron 11 is rotated by moving the handle section 20 down until the index pin 23 registers with the next index 22. This process of disengaging the index pin 23 and rotating the aileron 11 may continue until the aileron 11 is at the desired attitude. Preferably, the desired attitude of the aileron 11 for most driving conditions is forty degrees from vertical.

To return the aileron 11 to the upright, closed position, the process is repeated in the opposite direction. The handle section 20 is grasped and pushed, thereby disengaging the index pin 23 from the index 22, and the aileron 11 is rotated until the index pin 23 registers with the next index, repeating until the pin engages with the first index 22 and the aileron 11 is coplanar with the tailgate 1 frame.

Figure 4:
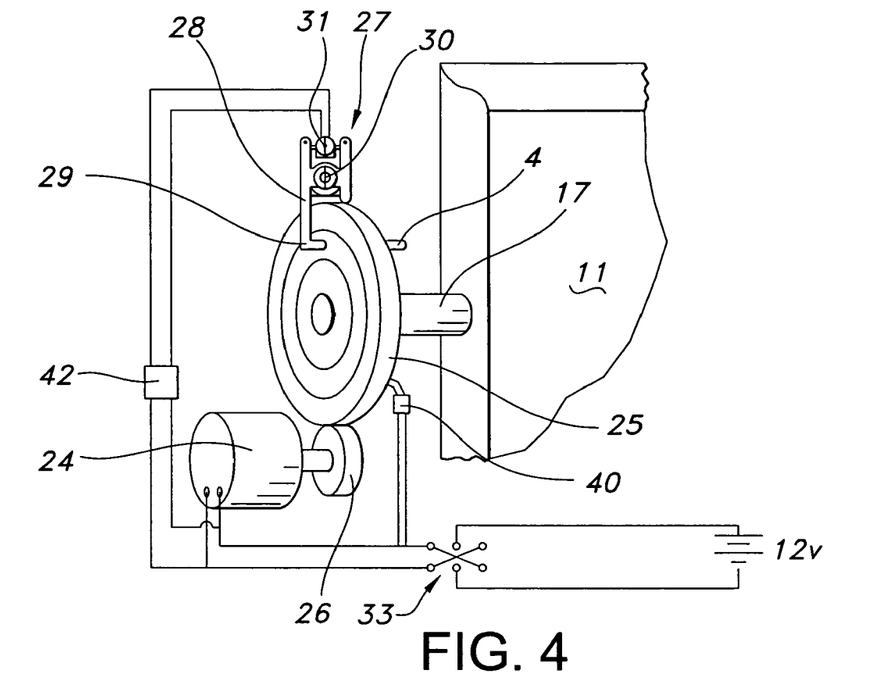
FIG. 4 is a schematic of an electrical powered means for operating the aileron.

In an alternative embodiment of the invention, the aileron 11 is operated by a powered rather than manual means. As shown in FIG. 4, the powered means is contained entirely within the interior cavity of the tailgate 1. The interior cavity may be accessed by removal of an access panel mounted on the forward surface of the tailgate 1.

In the powered embodiment, the axle first end 17 passes through the tailgate opening first side 9 (not shown), through the bushing 18 or similar device, into the interior cavity of the tailgate frame. Within the interior cavity, a driven gear or wheel 25 is mounted on the axle first end 17. At some point proximate to the circumference of the driven gear 25 is mounted a limit switch 40. A corresponding pin 41 is mounted on the driven gear 25 near its circumference, and aligned to engage with the limit switch 40. The limit switch 40 is positioned to be engaged by the pin 41 when the aileron 11 is in the fully opened position.

A drive motor 24 is also mounted within the internal cavity. The drive motor 24 is preferably a 12 volt D.C. electric motor 24 capable of using existing vehicle electrical systems. A preferred model for the electric motor is a Valeo™ electric motor, Model 404.130, which is commonly used for operating powered sun roofs in automobiles. This preferred model, and other like models, has sufficient torque for operating the aileron 11 and a sufficiently small profile for mounting within the internal cavity of the tailgate 1.

The output shaft of the electric motor 24 is mounted parallel to the axle 16 of the aileron 11. A drive gear 26 is mounted on the output shaft of the electric motor 24, the teeth of which mesh with the teeth of the driven gear 25 on the axle first end 17. Power is supplied to the electric motor 24 through a rocker switch 33 mounted in the interior of the vehicle cab. The rocker switch 33 may be of the type typically used for powered window operations. The rocker switch 33 is typically a double-pole, double-throw switch 33, which has three positions. The middle position de-energizes the circuit to the electric motor 24, while the other two positions energize the circuit to the motor in opposite polarities, i.e., forward or reverse polarity. Providing direct current in forward polarity will cause the output shaft to rotate in one direction, while providing direct current in reverse polarity will cause rotation in the opposite direction.

A brake 27 is provided enveloping part of the driven gear 25 preferably, or a separate disk (not shown) attached to the axle first end 17 near the driven gear 25. The brake 27 holds the axle first end 17 in a stationary position once the aileron 11 has been rotated to a desired attitude. The brake 27 is comprised of a bracket or caliper 28 with two arms straddling the driven gear 25 or disk. The caliper 28 is hinged with a spring 30 to cause each arm of the caliper 28 to press towards the driven gear 25. Friction pads 29 are mounted on the internal end of each caliper arm, which are caused to press against the driven gear 25 or disk, providing friction against rotation. In one embodiment, the force of the caliper 28 is constant. The friction is sufficient to maintain the aileron 11 in any desired position and resist aerodynamic forces when the vehicle is moving at normal speeds. However, the electric motor 24, when energized, supplies sufficient torque to overcome the frictional resistance of the brake 27 and cause the axle 16 to rotate. In another embodiment, the brake 27 is equipped with a solenoid 31 which operates when power is supplied to the electric motor 24. The solenoid 31 expands the caliper 28 arms and releases the friction pads 29 from the driven gear 25 or disk, thereby permitting unencumbered rotation by the electric motor 24. When power to the electric motor 24 is ceased, the solenoid 31 deactivates, permitting the spring 30 to return the friction pads 29 against the driven gear 25 or disk. The same source of power from the rocker switch 33 to the electric motor 24 may be used to power the solenoid. However, since the polarity of the electric current to the electric motor 24 will frequently reverse, an appropriate rectifying circuit 42, known in the art, is provided to have the solenoid 31 operate correctly regardless of the polarity of the power supply.

Figure 6A:
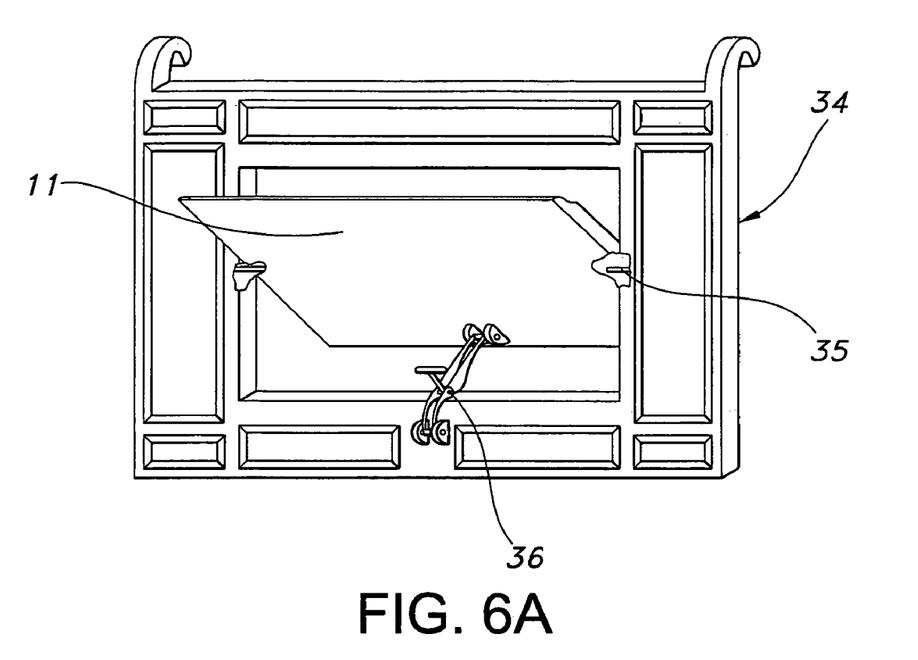
FIGS. 6A and 6B is an illustration of another embodiment of the invention suitable for use on commercial or industrial trucks.
Figure 6B:
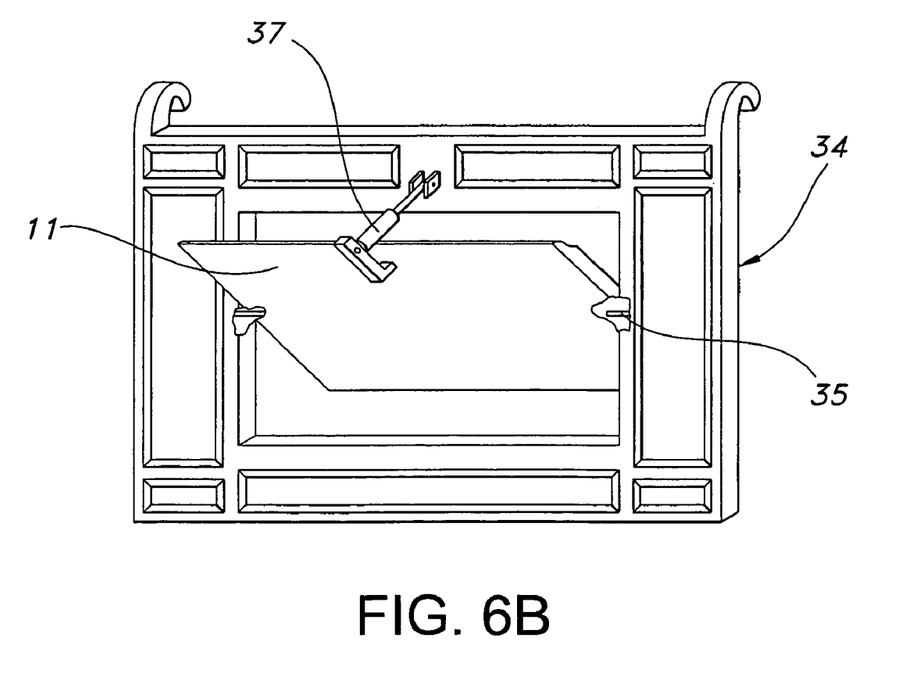

As shown in FIGS. 6A and 6B, another embodiment of the invention is useful for larger trucks or for removable, portable metal bins, commonly called roll-off bins. This embodiment necessitates a larger aileron 11, which would require more torque to operate than could reasonably be provided through the manual positioning lever described earlier. The rotation would also be in the opposite direction from the earlier embodiments. This opposite rotation, where the upper edge moves inward towards the interior of the truck or roll-off bin and the lower edge moves outward, is preferable because these vehicles or containers often are used to haul sand, gravel or other heavy granular materials, which would block the inward motion of the lower edge of the aileron 11.

A manual means for operating the larger aileron 11, as shown in FIG. 6A, in this embodiment would necessarily be disposed on the exterior surface of the tailgate 1 or rear gate of the roll-off bin. One manual means for operating the aileron 11 would be comprised of a simple, two-position cam-actuated lever 36. Positioning the cam-actuated lever 36 in one position opens the aileron 11, while positioning in the other closes the aileron 11.

Figure 7:
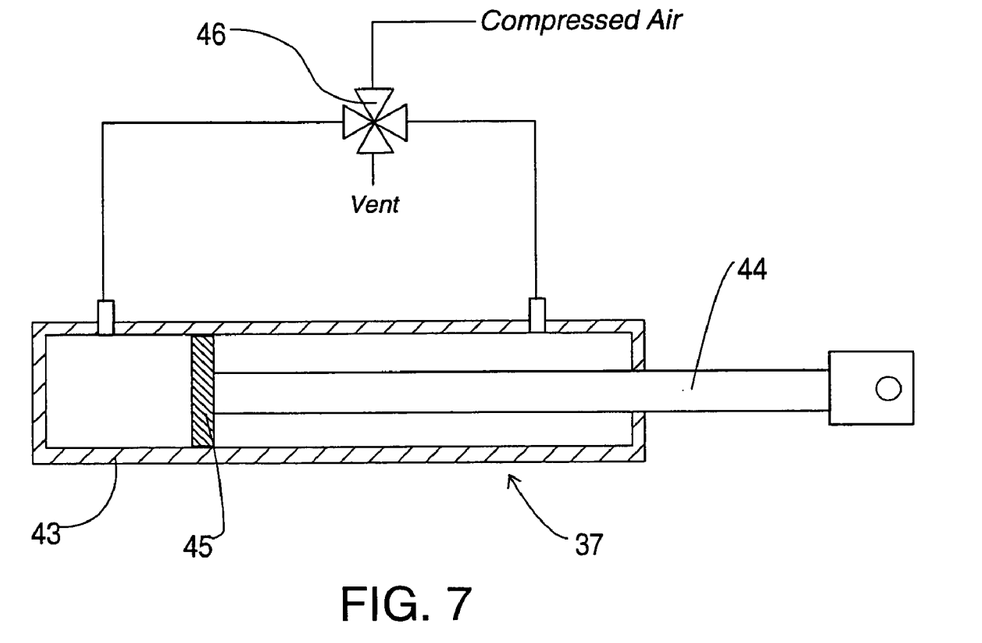
FIG. 7 is a schematic of a pneumatic actuator used on one embodiment of the invention.

A powered means for operating the larger aileron 11, as shown in FIG. 6B, would include a pneumatic actuator 37. When mounted on an industrial vehicle, the aileron 11 would require a more rugged system of mounting, such as external hinges 35. Industrial trucks, on which this larger aileron 11 would typically be mounted, usually have a source of compressed air for operating accessories, such as air brakes. As shown in greater detail in FIG. 7. This source of compressed air can also provide compressed air through a two-way valve 46 to the pneumatic actuator 37. The pneumatic actuator 37 is typically comprised of a sealed cylinder 43, a piston 45 inside the cylinder 43, capable of sliding longitudinally within the interior of the cylinder 43, and a rod connected at one end to one side of the piston 45 and extending through the end of the cylinder 43. A controlled source of compressed air is provided into the interior of the cylinder 43, at either end of the cylinder 43, on either side of the piston 45. To operate the pneumatic actuator 37, compressed air is supplied to either end of the cylinder 43, while the other end is vented. When compressed air is supplied to the end opposite the rod 44, the piston 45 is forced towards the rod-end of the cylinder 43, extending the rod 44 outward from the cylinder 43. Conversely, when compressed air is supplied to the end of the cylinder 43 adjacent the rod 44, the piston 45 is forced away from the rod-end of the cylinder 43, retracting the rod 44 into the cylinder 43.

As shown in FIG. 6B, in the powered embodiment of the larger aileron, one end of the pneumatic actuator 37 is mounted to the tailgate frame 34, preferably, or on another position on the vehicle, while the other end of the pneumatic actuator 37 is mounted on the aileron 11, preferably on a pivoting bracket. Compressed air is supplied to either of the two ends of the pneumatic actuator 37 from either of two outlet ports of a two-position valve 46. When compressed air is provided to the end of the pneumatic actuator 37 opposite the rod, the rod 44 extends, thereby positioning the aileron in an open attitude. When air pressure is supplied to the end adjacent the rod 44, the rod retracts, closing the aileron 11. Note that this scheme of operation is based on the mounting of the rod 44 on the aileron 11 as shown in FIG. 6B. If the end of the rod were mounted on the laterally opposite edge of the aileron 11, the operation of the pneumatic cylinder 37, as described, would have the opposite effect on the aileron 11.

The two-way valve 46 typically has four ports. Each port may be in hydraulic communication with one of either its two adjacent ports, depending upon the positioning of the valve, but never with the opposing port. As configure in FIG. 7, the two way valve 46 would, in one position, supply compressed air into the cylinder 43 on one side of the piston 45 and vent the other end of the cylinder 43. In the other position of the valve 46, the reverse would occur. The valve may be operated manually, either at the tailgate 11 or elsewhere on the vehicle, such as in the vehicle cab. Alternatively, the valve may be located proximate to the pneumatic actuator 37 and operated by an electrical solenoid (not shown) remotely controlled, from the cab, for example, by an electrical circuit.

In addition to the pneumatic actuator 37, other pressurized fluid actuators, such as a hydraulic cylinder, are suitable as means for positioning the larger aileron on a commercial or industrial truck or roll-off container.

The aileron 11 may be fabricated of common sheet steel using bending, forming and welding methods well known in the art.

While various embodiments of the invention have been described above, it should be understood that they have been presented by way of example, and not limitation. It will be apparent to person skilled in the relevant art that various changes in form and detail may be made therein without departing from the spirit, and scope and application of the invention. This is especially true in light of technology and terms within the relevant art that may be later developed. Thus, the present invention should not be limited by any of the above-described exemplary embodiments, but should only be defined in accordance with the appended claims and their equivalents.

What is claimed is:

1. A truck tailgate aileron system, comprised of:
   a tailgate, disposed at one end of a truck cargo bed or portable cargo container mountable on a truck, said tailgate having a tailgate opening disposed therein, with contoured upper and lower edges and parallel first and second sides;
   an aileron having parallel first and second sides and of an overall shape appropriate for engaging the aileron within the tailgate opening, wherein said aileron has upper and lower edges contoured correspondingly to the contoured upper and lower edges, respectively, of the tailgate opening, and has parallel first and second sides, said first and second sides of the aileron are in coaxial pivotal engagement with the corresponding first and second sides of the tailgate opening, wherein the aileron upper and lower edges are capable of superficial communication with the corresponding tailgate opening upper and lower edges, respectively; and
   positioning means for positioning and securing the aileron in a desired attitude.

2. The truck tailgate aileron system of claim 1, wherein the positioning means is comprised of a manual linkage, one end of which is mounted on an exterior surface of the aileron and the other is mounted on the tailgate or the truck.

3. The truck tailgate aileron system of claim 1, wherein the positioning means is comprised of a pressurized fluid actuator and an extendable rod extending from one end of said actuator, wherein the actuator is mounted at an end opposite the extendable rod to the tailgate or to the truck and the opposite end of the extendable rod is mounted to the aileron.

4. The truck tailgate aileron system of claim 3, wherein the pressurized fluid actuator is a pneumatic actuator.

5. The truck tailgate aileron system of claim 1, further comprised of an axle rigidly disposed on the aileron coaxial with the axis of the pivotal engagement between the sides of the aileron and the sides of the tailgate opening, a first end of said axle protruding through an opening in the first side of the tailgate opening.

6. The truck tailgate aileron system of claim 5, wherein the positioning means is comprised of:
   a positioning lever disposed on the first end of the axle, said positioning lever having means for manual operation from outside the tailgate, and having a plurality of indices; and
   an index pin disposed for engaging with the indices and securing the positioning lever against rotational movement.

7. The truck tailgate aileron system of claim 5, wherein the positioning means is comprised of:
   a driven gear disposed coaxially on the axle within the tailgate interior of the first side of the tailgate opening;
   a drive gear disposed coplanar with the driven gear; and
   an electric motor, having a drive shaft coaxially engaged with the drive gear.

8. The truck tailgate aileron system of claim 7, further comprised of a brake, said brake comprised of means of frictional engagement with the driven gear for arresting rotation of the axle when positioned in a selected attitude.

9. The truck tailgate aileron system of claim 8, wherein the brake is further comprised of releasing means for releasing frictional engagement with the driven gear when the positioning means is operative.

10. The truck tailgate aileron system of claim 7, further comprised of:
    a brake disk disposed coaxially on the axle within the tailgate in tandem with the driven gear, and
    a brake, said brake comprised of means for frictional engagement with the brake disk for arresting rotation of the axle when positioned in a selected attitude.

11. The truck tailgate system of claim 10, wherein the brake is further comprised of releasing means for releasing frictional engagement with the brake disk when the positioning means is operative.

12. The truck tailgate aileron system of claim 7, further comprised of a power supply to provide direct current power to the electric motor, wherein said power supply is capable of providing direct current power in either forward or reverse polarity to the electric motor.

13. The truck tailgate aileron system of claim 12, wherein the power supply is comprised of a double-pole, double-throw switch for reversing the polarity of the direct current supplied to the electric motor.

* * * * *